S. C. TALCOTT.
BUTTONHOLE FOR CARRIAGES.
No. 66,413.           Patented July 2, 1867.
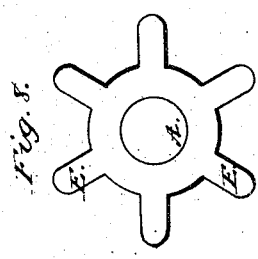
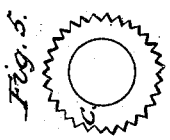
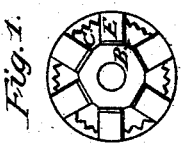
Inventor:
S. C. Talcott
Witnesses:
W. H. Burridge
Frank S. Alden.

United States Patent Office.

S. C. TALCOTT, OF ASHTABULA, OHIO.

Letters Patent No. 66,413, dated July 2, 1867.

IMPROVED BUTTON-HOLE FOR CARRIAGES.

The Schedule referred to in these Letters Patent and making part of the same.

TO ALL WHOM IT MAY CONCERN:

Be it known that I, S. C. TALCOTT, of Ashtabula, in the county of Ashtabula, and State of Ohio, have invented certain new and useful improvements in Elastic Button-Hole for Carriages, being an improvement on a patent granted to me November 13, 1866; and I do hereby declare that the following is a full and complete description of the same, reference being had to the accompanying drawings, making a part of this specification, in which—

Figure 1 is a view of the button-hole.

Figures 2 and 6 are transverse sections.

Figures 3, 4, and 5, detached sections, to which reference will be made.

Like letters of reference refer to like parts in the views.

The nature of this invention consists in making the hole for the reception of the button of rubber, so that when the button is in the hole the sides of the same in virtue of its elasticity will close tightly around the neck of the button, and thereby prevent it from pulling off or in any way getting loose.

In my former patent the button-hole therein described was constructed in a similar manner, viz, with a washer, A, fig. 3, rubber disk B, fig. 4, and washer C, fig. 5, all of which were arranged in the same order as the parts in this hole, and fixed to the curtains or cloth D, fig. 6, in the same manner. But in that button-hole the washer C was simply a plain smooth-edged ring, the consequence of which was that the rubber disk was not held securely in place between the washers A C, but became displaced by the strain exerted on one side of the hole, drawing the entire disk in that direction, thereby making it difficult to unbutton and button the curtains. Also, the rubber by its elastic nature, and in consequence of its being loose between the washers, would pull out, and thus render the hole worthless. In order to avoid these difficulties, and make the rubber disk permanent in its place, and thereby preserve the useful character of the hole, the disk C is made with a serrated or toothed edge, as shown in fig. 5. The points of the teeth are bent downward, as seen in figs. 2 and 6. By this it will be obvious that when the rubber is laid on the washer A, and the washer C in turn laid upon the rubber, the points of the teeth will penetrate the rubber and thereby hold it securely from being drawn away or displaced in any direction, thus making the rubber secure and the hole durable. In the former button-hole the washer A, fig. 3, was provided with short angular lugs, whereas in this arrangement the washer is furnished with arms, E, which on being turned up at a right angle, as shown in fig. 2, are introduced into the hole made in the curtain and then turned down upon it, as shown in fig. 6, thus lapping further over upon the curtain than did the lugs in my first button-hole, giving thereby greater strength in the attachment of the button to the curtain.

What I claim as my improvement, and desire to secure by Letters Patent, is—

1. The washer A, provided with the arms E, disk B, and serrated washer C, arranged in the manner and for the purpose substantially as set forth.

2. A washer, fig. 3, in combination with the disk B, when constructed substantially as described and applied to the purpose set forth.

3. The serrated washer C, in combination with the disk B, when applied to the purpose and in the manner specified.

S. C. TALCOTT.

Witnesses:
W. H. BURRIDGE,
E. E. WAITE.